(12) United States Patent
Meller

(10) Patent No.: US 7,709,973 B2
(45) Date of Patent: May 4, 2010

(54) AIRBORNE STABILIZED WIND TURBINES SYSTEM

(76) Inventor: Moshe Meller, 8 Balfur St., Tel Aviv (IL) 65213

( * ) Notice: Subject to any disclaimer, the term of this patent is extended or adjusted under 35 U.S.C. 154(b) by 0 days.

(21) Appl. No.: 12/284,046

(22) Filed: Sep. 18, 2008

(65) Prior Publication Data
US 2010/0066093 A1 Mar. 18, 2010

(51) Int. Cl.
*F03D 9/00* (2006.01)
*H02P 9/04* (2006.01)

(52) U.S. Cl. .......................... 290/55; 290/44
(58) Field of Classification Search ............... 290/43, 290/44, 54, 55; 415/2.1, 4.2, 4.5, 4.3, 7; 60/398; 416/132 B, 84; 244/30, 153 R
See application file for complete search history.

(56) References Cited

U.S. PATENT DOCUMENTS

| 4,073,516 | A |   | 2/1978 | Kling |
| 4,084,102 | A |   | 4/1978 | Fry et al. |
| 4,165,468 | A | * | 8/1979 | Fry et al. .................. 290/55 |
| 4,166,569 | A |   | 9/1979 | Begnaud et al. |
| 4,166,596 | A | * | 9/1979 | Mouton et al. ............. 244/30 |
| 4,219,303 | A |   | 8/1980 | Mouton, Jr. et al. |
| 4,285,481 | A |   | 8/1981 | Biscomb |
| 4,309,006 | A |   | 1/1982 | Biscomb |
| 4,350,898 | A | * | 9/1982 | Benoit ....................... 290/55 |
| 4,350,899 | A |   | 9/1982 | Benoit |
| 4,358,243 | A |   | 11/1982 | Heath |
| 4,383,182 | A |   | 5/1983 | Bowley |
| 4,450,364 | A | * | 5/1984 | Benoit ....................... 290/55 |
| 4,470,563 | A | * | 9/1984 | Engelsman ................. 244/33 |

(Continued)

FOREIGN PATENT DOCUMENTS

JP 57070964 A * 5/1982

(Continued)

OTHER PUBLICATIONS

Related U.S. Appl. No. 12/144,222, filed Jun. 23, 2008, inventor Moshe Meller.

(Continued)

*Primary Examiner*—Julio Gonzalez
(74) *Attorney, Agent, or Firm*—Frishauf, Holtz, Goodman & Chick, P.C.

(57) ABSTRACT

An airborne system for producing electricity from wind energy includes a shaft, wind turbines rotatably mounted to the shaft and arranged to rotate independently in opposite directions when subjected to the same wind, and generators arranged to convert rotation of the turbines into electricity. A lifting section includes combination of kites and lighter than air balloons, generating a lifting force that caused the system being airborne at desire altitude. The center of gravity of the system is lower than the center of lift of the system; when the turbines of the system exposed to wind and start to rotate, torques are inducing on the shaft of the system; these torques are balancing each other and the remaining deferential torque being balanced by returning torque that is generated by the angular deviation of the center of gravity from it's lowest position, the magnitude of this returning torque, increasing as the angular deviation increased, until the system reach angular stability; electricity is generating and conducted through tether to an anchoring section for usage.

9 Claims, 9 Drawing Sheets

U.S. PATENT DOCUMENTS

| | | | |
|---|---|---|---|
| 4,491,739 A | 1/1985 | Watson | |
| 4,495,423 A | 1/1985 | Rogers | |
| 4,547,124 A | 10/1985 | Kliatzkin et al. | |
| 4,572,962 A * | 2/1986 | Shepard | 290/55 |
| 5,040,948 A | 8/1991 | Harburg | |
| 5,062,765 A | 11/1991 | McConachy | |
| 5,506,453 A | 4/1996 | McCombs | |
| 5,798,632 A | 8/1998 | Muljadi | |
| 6,091,161 A | 7/2000 | Dehlsen et al. | |
| 6,127,739 A | 10/2000 | Appa | |
| 6,278,197 B1 | 8/2001 | Appa | |
| 6,492,743 B1 | 12/2002 | Appa | |
| 6,945,747 B1 | 9/2005 | Miller | |
| 7,129,596 B2 | 10/2006 | Macedo | |
| 7,183,663 B2 | 2/2007 | Roberts et al. | |
| 7,309,930 B2 | 12/2007 | Suryanarayanan et al. | |
| 7,317,261 B2 * | 1/2008 | Rolt | 290/55 |
| 7,335,000 B2 | 2/2008 | Ferguson | |
| 7,384,239 B2 | 6/2008 | Wacinski | |
| 7,489,046 B2 | 2/2009 | Costin | |
| 2007/0228738 A1 * | 10/2007 | Wrage et al. | 290/44 |
| 2008/0023964 A1 | 1/2008 | Sureshan | |
| 2008/0048453 A1 * | 2/2008 | Amick | 290/44 |

FOREIGN PATENT DOCUMENTS

| | | | |
|---|---|---|---|
| JP | 02161173 A * | 6/1990 | |
| WO | WO 2007/051034 A2 | 5/2007 | |

OTHER PUBLICATIONS

Related U.S. Appl. No. 12/465,877, filed May 14, 2009, inventor Mosher Meller.

Notice of Allowance mailed Jun. 18, 2009 issued in related U.S. Appl. No. 12/144,222.

International Search Report and Written Opinion (in English) dated Jan. 14, 2010, issued in a counterpart International Application of related U.S. Appl. No. 12/144,222. 6 pages.

* cited by examiner

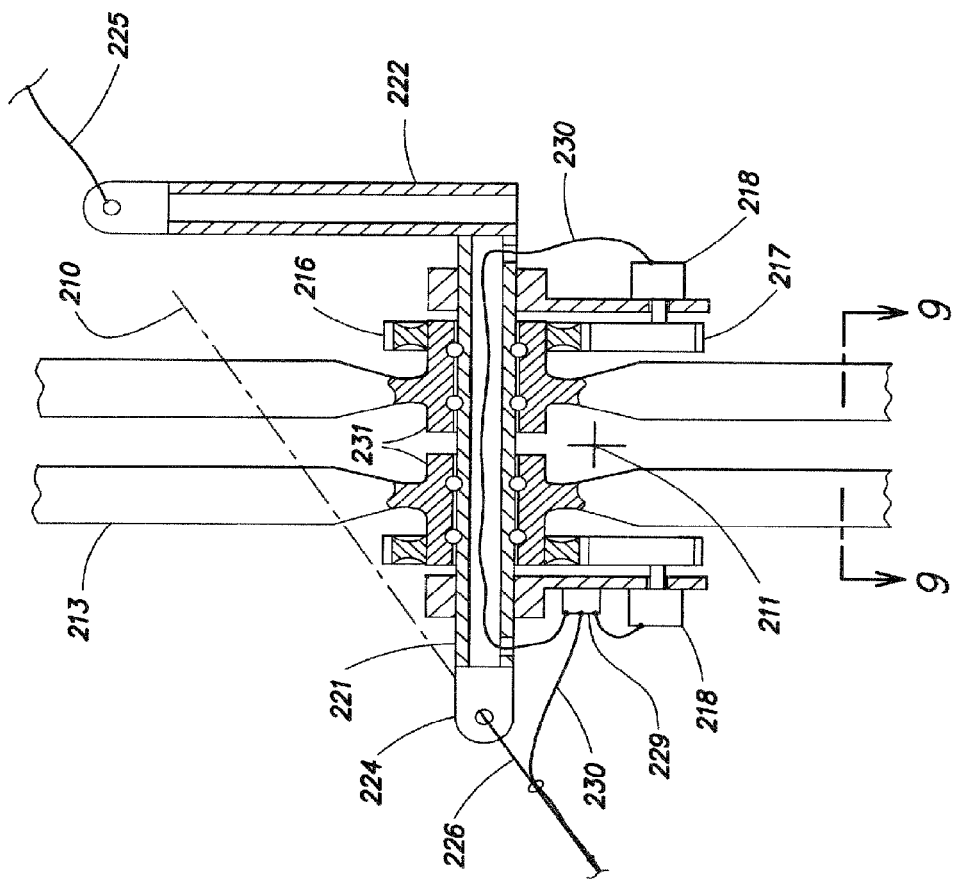
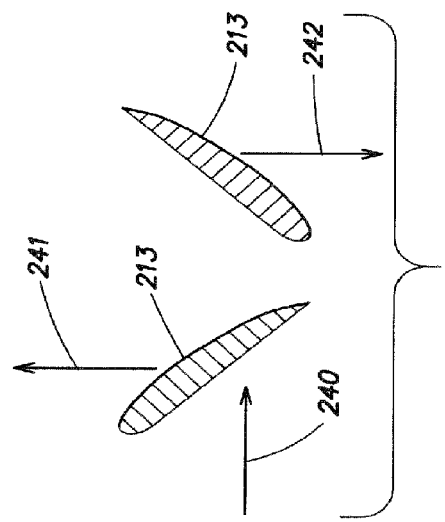
FIG. 8
FIG. 9

AIRBORNE STABILIZED WIND TURBINES SYSTEM

FIELD OF THE INVENTION

The present invention relates generally to a wind turbine system for generating electricity and more specifically to a wind turbine system for generating electricity which is air borne, and includes both turbine and generator on a common, airborne structure.

BACKGROUND OF THE INVENTION

Wind energy is one of the most readily available forms of renewable energy, which include solar, hydro, geothermal energy, and is therefore often used to generate electricity. The density of wind energy, in terms of watts per square meter, is one of the highest among other forms of renewable energy.

Existing systems for utilizing wind energy to generate electricity have certain disadvantages. For example, since wind velocity generally increases with altitude and a large wind velocity is critical to optimize wind-based electricity generation, tall towers must be constructed to elevate a wind turbine to a high operational altitude in order to maximize the potential to generate electricity from the wind. However, tall towers are expensive to build and once built, are subject to intense vibrations during operation. Furthermore, land for building the towers to support such wind turbines is limited in view of numerous, known factors, including acquisition costs, environmental impact, zoning issues.

Although offshore winds, i.e., winds over bodies of water, are stronger than winds over land, the construction of support structures for wind turbines over a body of water is expensive, although there are significantly fewer limitations on the space for building support structures over such bodies of water. The most notable limitation is that the construction of support structures for wind turbines is limited to certain depths of the bodies of water.

In view of the problems with installing wind-based electricity generating systems over land or bodies of water, flying windmills have been developed. Generally, such flying windmills do not require an extensive support structure connected to land or otherwise anchored over a body of water. One such flying windmill is the well-known Magenn system, which is lighter than air, and utilizes the Magnus effect. A drawback of this prior art system is that its power generation is very limited and it is not very efficient.

Another flying windmill currently under development is a flying electric generator, by Sky Wind Power Company. This system is heavier than the air and attempts to utilize the wind in the upper level of the atmosphere. Among its drawbacks are that it is expensive to construct, includes complex mechanical parts and is not very practical.

It would therefore be desirable to provide an airborne wind turbine, electricity-generating system, which overcomes the drawbacks of the systems mentioned above.

OBJECTS AND SUMMARY OF THE PRESENT INVENTION

It is an object of the present invention to provide a new and improved system and method for generating electricity from wind at different altitudes.

It is an object of the present invention to provide the said system which will be angularly stable while being airborne.

In order to achieve these objects and possibly others, a system for producing electricity from wind in accordance with the invention includes a shaft, a turbine section including at least one wind turbine that can rotate relative to the said shaft when exposed to a wind; at least one generator arranged to convert rotation of the wind turbine into electricity. The system also includes lifting section, connected to the turbine section for generating a lifting force to enable system to be airborne at desire altitude. The system is connected by tether to an anchoring section. The electricity generated by the generators is conducted to usage or energy storage via the anchoring system. The anchoring system can include a winch that can control the operational altitude of the system.

The amount of power that can produce by the system of the present invention is proportional to the multiplication of the torque that the wind turbine induces on the system by the angular velocity of the turbine; power=torque×angular velocity. As the diameter of high power wind turbine is very large, the angular velocity of the turbine is relatively low, and therefore, the torque that the turbine inducing on the system through the generator is very high. In order to keep the angular stability of the system, it is necessary to provide a balancing torque which will balance the torque that the wind turbine is inducing on the system while operating, this balancing torque must be equal to the wind turbine's torque, and in opposite direction. Without the said balancing torque, the whole system will be rolling angularly in the direction of the wind turbine rotation and no electricity can be generated.

The main object of the system of the present invention is to provide the said balancing torque to the airborne wind turbine system.

In order to continue this description of the present invention, two expressions will be defined:

CENER of GRAVITY;

And: CENTER of LIFT of stationary floating body;

Center of Gravity of a body, defined as the point in or near a body at which the gravitational potential energy of the body, is equal to that of a single particle of the same mass (as the body), located at the same point and through which the resultant of the gravitational forces on the component particles of the body act.

Another word, the Center of Gravity is a point that if all the mass elements of the body will be concentrated in this said point, the same physical status of the body would be resulted.

Center of Lift of stationery floating body, defined as the point in or near the body, that if all the partial lifting forces acting on the said floating body will be concentrated in this said point, the same physical status of the body will be resulted.

In one version of the invention the turbine section, (which includes the main shaft, the generator and the transmission) is attached to two inflated lighter than air bodies, one in front of the turbine section and the second behind the turbine section. In this version of the invention the shaft of the turbine and the generator are placed below the center of the inflated lighter than air bodies in a way that the center of gravity of the system is lower than the center of lift of the system. When the turbine is not rotating the system will positioned it self in a way that the center of gravity is vertically below the center of lift of the system (like pendulum), when the turbine start to rotate, torque will induce on the system and the system will start to rotate in the same direction of the turbine; by this rotation the angular position of the center of gravity will change, and angle will opened between the line that connect the center of gravity point with the center of lift point and the vertical direction; this said angle will be called alpha. A returning torque will act on the system (as the returning torque acting on pendulum). The said returning torque will be called RT.

RT=mg×d×Sin. Alpha; m is the mass of the system; g is the gravity; d is the distance between the center of gravity and the center of lift; the maximum returning torque:

RT max=mg×d×1

(Sin. 90=1). The torque that the wind turbine inducing on the system will be called WT;

If WT<mg×d, the system will reach equilibrium when 0<angle Alpha<90.

In another version of the invention, one end of the turbine section is connecting by tether to the lifting section; and the other end of the turbine section, by another tether to the anchoring section. The line between the two points of the turbine section that are connected to these two tethers will be called the Line of Tension. The system is being constructed in a way that the center of gravity of the system is lower than the said Line of Tension. When the wind turbine is not rotating, the system bring it self to a position where the center of gravity will be vertically in the lowest possible position relative to the Line of Tension, (like pendulum). When the wind will blow through the turbine, the turbine will rotate and will induce rotational torque on the system, the system will start to rotate to the same direction of the turbine; by this said rotation of the system, the angular position of the center of gravity will change; and angle will be opened between the plain that connect the center of gravity point with the Line of Tension, and the vertical plain that is crossing the line of Tension. This said angle will be called Alpha. A returning torque will act on the system (as the returning torque that acting on pendulum). This returning torque will be called again RT, the calculations are the same as the above; the only different is that d will be the distance between the center of gravity point and the Line of Tension.

RT=mg×d×Sin. Alpha; RT max=mg×d×1; and if WT<mg×d the system will reach equilibrium; when 0<angle Alpha<90.

In another version of the invention, the turbine section will include more than one wind turbine, these said turbines constructed in a way that when the wind is blowing through them they will rotate in opposite directions; therefore each one of the turbines will induce rotational torque on the system in opposite direction. These said opposite rotational torques will balance each other; but in order to avoid the rotating of the whole system the result of the torques acting on the system, must be zero, achieving zero torques result, requires a very accurate and complicated angular controller; this angular controller should continuously control the angle of attack of the wind turbines blades, the power that produced by the generators of the system and other things that can influence the magnitude of the torque that each turbine inducing on the system. The alternative to this complicated angular controller is system that utilizing the principle of the present invention in the same way that described above. The only different in this type of systems with more than one wind turbine, is that the required returning torque RT needs to balance only the differential unbalanced torque that has not been balanced by the opposite rotating turbines. And that can be achieved in low cost and in simple and reliable way, using the principle of the present invention.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 8 is a detailed view partly cross section of the turbine section of the system showing in FIG. 6 when the system includes two turbines.

FIG. 9 is a cross section view along the line 3-3 of FIG. 8, this cross section view showing the opposite angle of attack of the blades of the two turbines showing in FIG. 8.

DETAILED DESCRIPTION OF THE INVENTION

Referring to the accompanying drawings

Figure 1:
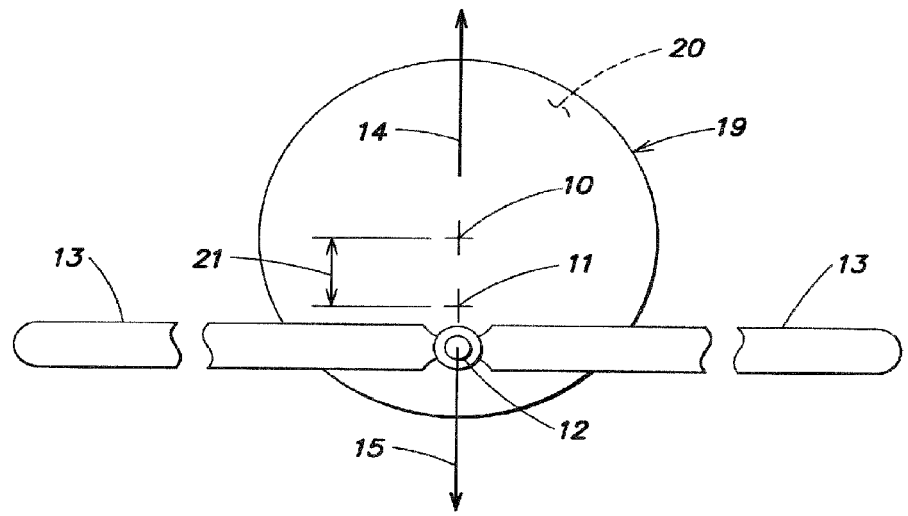
FIG. 1 is schematic front view partly cross section of the system of the present invention when the wind turbine of the system is not rotating.
Figure 2:
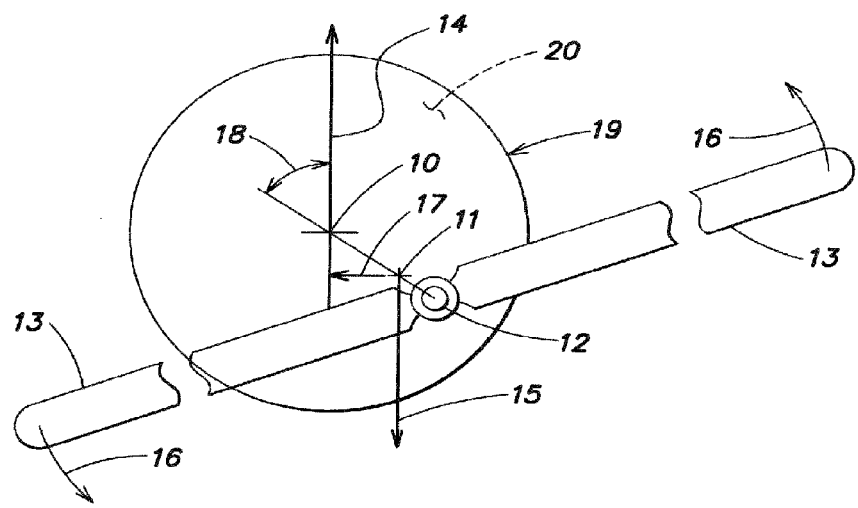
FIG. 2 is the system of FIG. 1 in equilibrium status when the wind turbine is rotating.

FIG. 1 and FIG. 2 are schematic drawings of the system of the present invention, many details are not showing in these drawings and will be showed and explained later, the purpose of these simple drawings is to explain the basic principals of the system of the present invention. 19 is sealed cylindrical body; 19 is filled with lighter than air gas 20, such as helium or hydrogen;

The system has two similar bodies 19, one of them is not showing in the drawings. The two bodies 19 are lighter than air and are generating a lift force 14 (14=L) which caused the system to be airborne in the atmosphere. The two bodies 19 are connected to each other rigidly by a shaft 12; the shaft 12 is placed below the symmetrical center of the two 19 bodies; a wind turbine 13 is rotatably mounted to the shaft 12, in a way that allow the turbine 13 to rotate relative to the shaft 12. The turbine 13 is connected through transmission to a generator, (the generator is not showing in this drawings), the generator is mounted rigidly and fixed to the shaft 12. The total weight of the floating system is 15 which is equal to mg. m is the total mass of the system, and g is the gravity. 10 is the Center of Lift of the system, and 11 is the Center of Gravity of the system, (the center of lift and the center of gravity defined above).

The lift force 14>15, (15 is the weight of the system), a tether which is not showing in these drawings control the system altitude. When the turbine 13 is not rotating, the system will positioned it self in a way that the center of gravity 11 will be vertically below the center of lift 10, (same as pendulum). The distance between the points 10 and 11 is 21 (21=d). This position is showing in FIG. 1.

When the wind is blowing through the turbine 13 the blades of the turbine will start to rotate in 16 direction as showing in FIG. 2; the turbine 13 will transfer the rotational motion to the generator, the generator while generating electricity will resist the transferred rotational motion, and as the generator is rigidly mounted to the shaft 12, the rotational torque of the turbine 13 will be transferred to the whole system through the shaft 12. The system will start rolling angularly in the same direction of the rotation of the turbine 13, and angle 18 (18=Alpha) will be opened between the line that connect point 10 to point 11, and the vertical direction. A returning torque will act on the system, this torque will be RT; the distance between the center of gravity point 11 and the vertical line that pass through the center of lift point 10, is 17 (17=d×Sin. Alpha);

Therefore: RT=mg×d×Sin. Alpha; RT max=mg×d×1 (Sin. 90=1);

The torque that the turbine 13 is inducing on the system is: WT. if WT<RT max, the system will reach equilibrium when: 0<Alpha<90;

If, WT>RT max the system will keep rolling angularly and no electricity can be produced.

Figure 3:
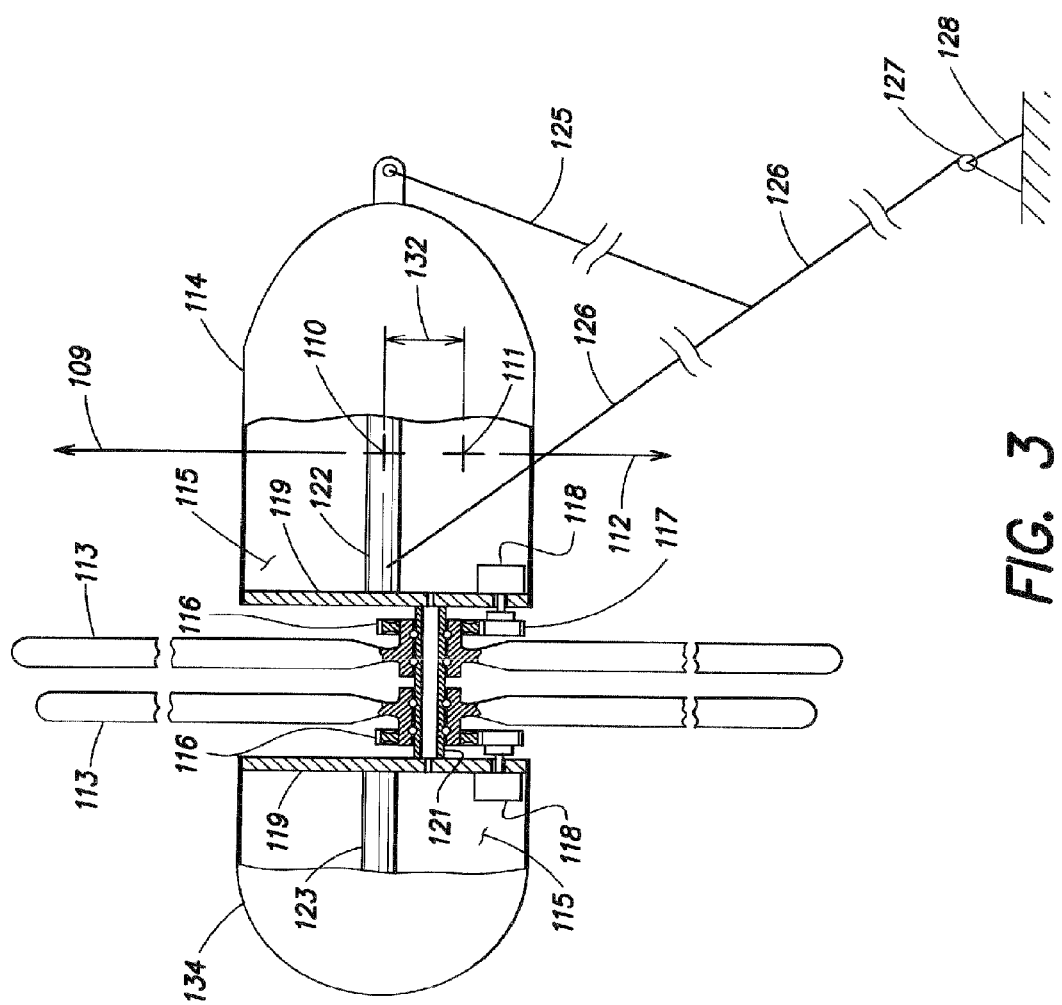
FIG. 3 is a side view partly cross-section, of the first embodiment of a wind turbine system in accordance with the present invention.
Figure 4:
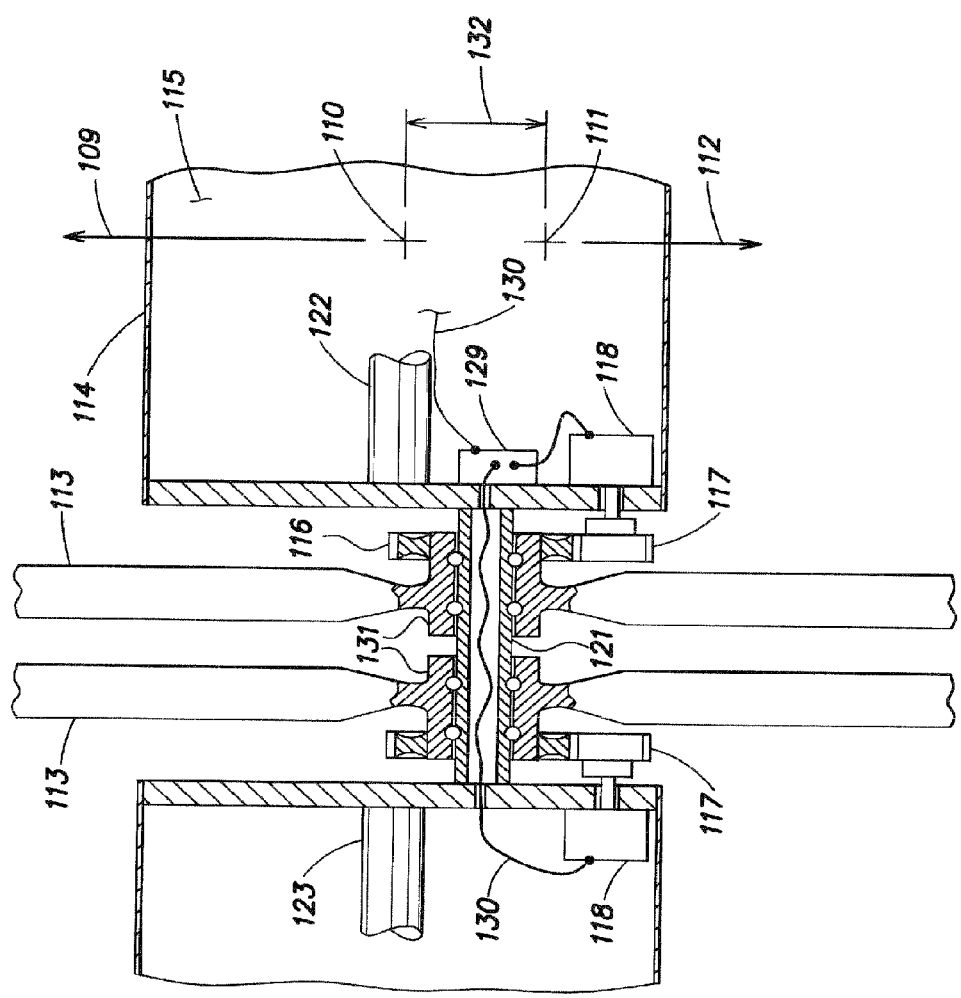
FIG. 4 is a detailed view partly cross section, of the turbine section of the system showing in FIG. 3, when the system has two turbines.
Figure 5:
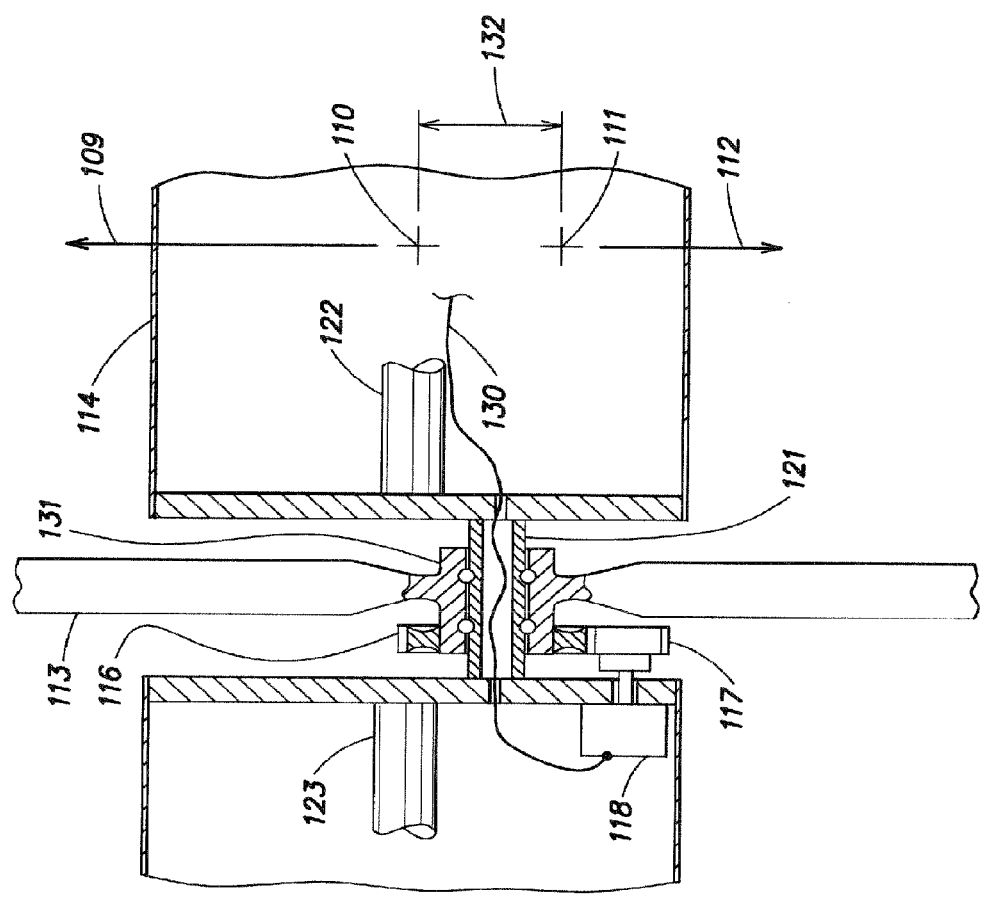
FIG. 5 is a detailed view partly cross section, of the turbine section of the system showing in FIG. 3 when the system has one turbine.

FIG. 3 is a side view partly cross section of the first embodiment of the present invention; FIG. 4 and FIG. 5 are two version of this first embodiment.

In FIG. 3, 114 is a sealed inflatable front floating body; this body is filled with lighter than air gas 115, this gas can be helium, hydrogen, hot air, or any lighter than air gas; 134 is the rear inflatable floating body that filled also with gas 115; these two floating bodies generating combine lifting force 109; (109=L); the combined lifting force 109 can be consider as acting on the system through the center of lift point 110; the center of lift point has been defined above. The total weight of the system is 112 (112=mg); the total weight of the system can be considered as acting through the center of gravity point 111; the center of gravity point has been defined above; the vertical distance between 110 and 111 is 132, (132=d); when the system's turbines is in rest status. The system is floating in the air, therefore 109>112 (L>mg), the access lift force is balanced by the tethers 126 and 125; the tether 126 is connected to the anchoring base 128 through winch 127; winch 127 can adjust the operational altitude of the system. 122 is a structural beam that support the body 114 and connected the system to the tethers 125 and 126; 122 is also connected rigidly to the supporting wall 119; another supporting wall 119 connected rigidly to the rear structural beam 123 that supporting the rear floating body 134. A shaft 121 is mounted rigidly and fixed between the two supporting walls 119; the shaft 121 is placed vertically below the center of the supporting walls 119

The shaft 121 is connecting the front body 114 to the rear body 134.

Around the shaft 121 one or more than one, wind turbines 113 are rotatably mounted; FIG. 4 is showing a detailed side view cross section of version of this embodiment which includes two wind turbines; (more than two turbines can be included in this embodiment of the invention).

FIG. 5 is showing a detailed side view cross section of version of this embodiment which includes one wind turbine; the turbines 113 are assembled around the shaft 121 through bearings 131; the bearings 131 allow the turbines to rotate around the shaft 121.

Generators 118 are mounted to the supporting walls 119; the generators 118 are connected to the turbines 113 through gear wheels 117 that are mounted rigidly to the generators shaft, and gear wheels 116 that are mounted rigidly to turbines 113; the electricity that produced by the generators while rotating passed by conductive wire 130 through the hollow shaft 121 to transformation unit 129, and from 129 to the tether 126, and attached to tether 126 to the anchoring base 128, for usage or to energy storage.

The role of the transformation unit 129 is to collect the electricity from all generators 118 and to unify them to one output at desired voltage. In case that the system includes one turbine, one or more than one generator can be used, this version is showing in FIG. 5.

When the turbines of the system are not rotating, the system will positioned it self in a way that 111 (the center of gravity) is approximately vertically below 110 (the center of lift)

When turbines 113 of this embodiment are exposed to wind, the airborne system will be drifted down wind in a way that the shaft 121 will be substantially parallel to the wind direction. In the version showing in FIG. 3 and FIG. 4 the two turbines will start to rotate relative to the shaft 121; each turbine will rotate to opposite direction from the other turbine, as their blades have opposite angle of attack relative to the wind direction; each turbine will induce a rotating torque on the system through the generators. These torques will be WT1 and WT2 the two torques will act on the system in opposite direction and therefore they will balance each other; the difference between the two torques, will be WT3; (WT1−WT2=WT3); the whole system will start to rotate in the direction of WT3; angle Alpha will be opened between the vertical direction and the line between 110 and 111; as explained above returning torque will act on the system in opposite direction of WT3; (same as in pendulum). If WT3<mg×d; (mg=112; d=132), the system will reach equilibrium when: 0<angle alpha<90.

If the version of this embodiment includes one turbine as showing in FIG. 5, the torque that will be induced on the system by one turbine will be WT, and in this case the system can reach equilibrium just if WT<mg×d; (mg=112; and d=132).

Figure 6:
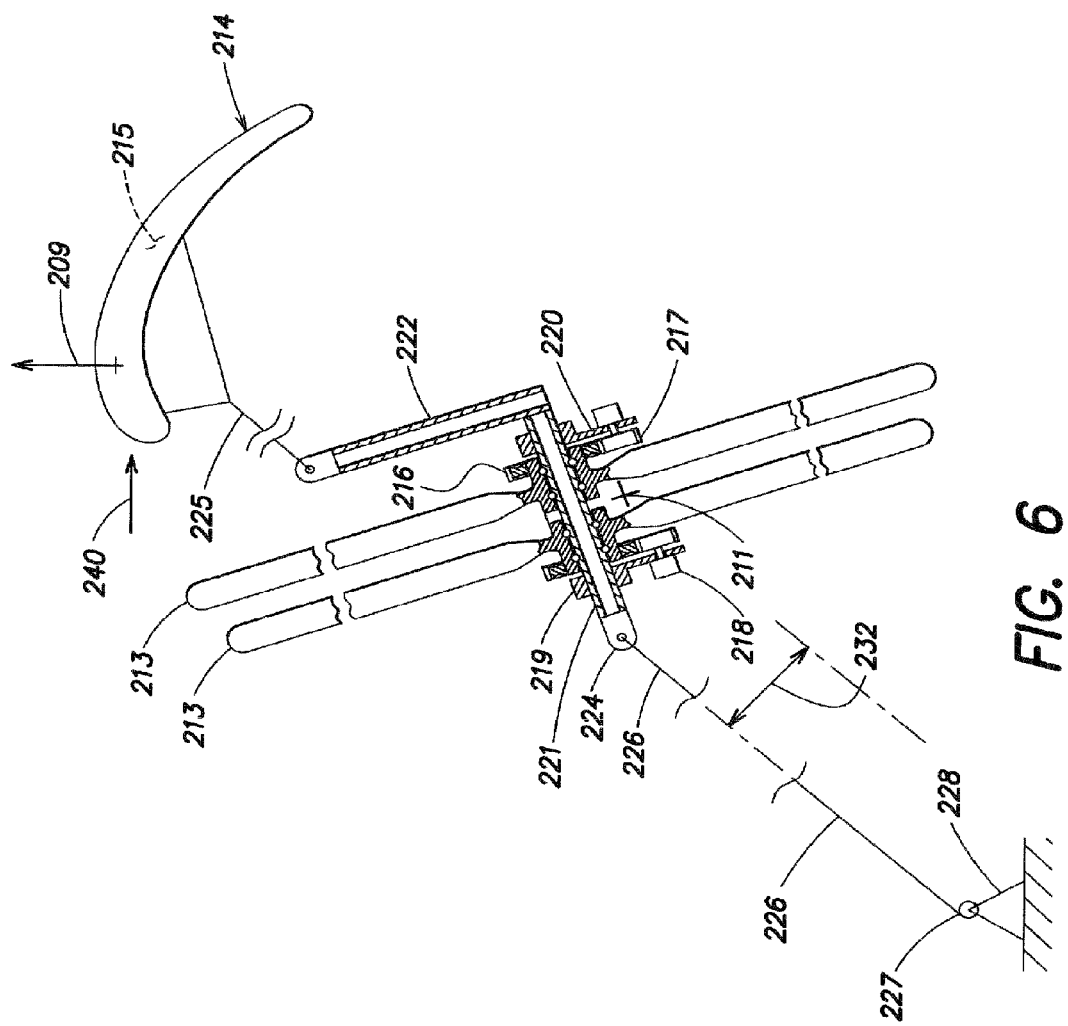
FIG. 6 is a side view partly cross section of second embodiment of a wind turbine system in accordance with the present invention.
Figure 7:
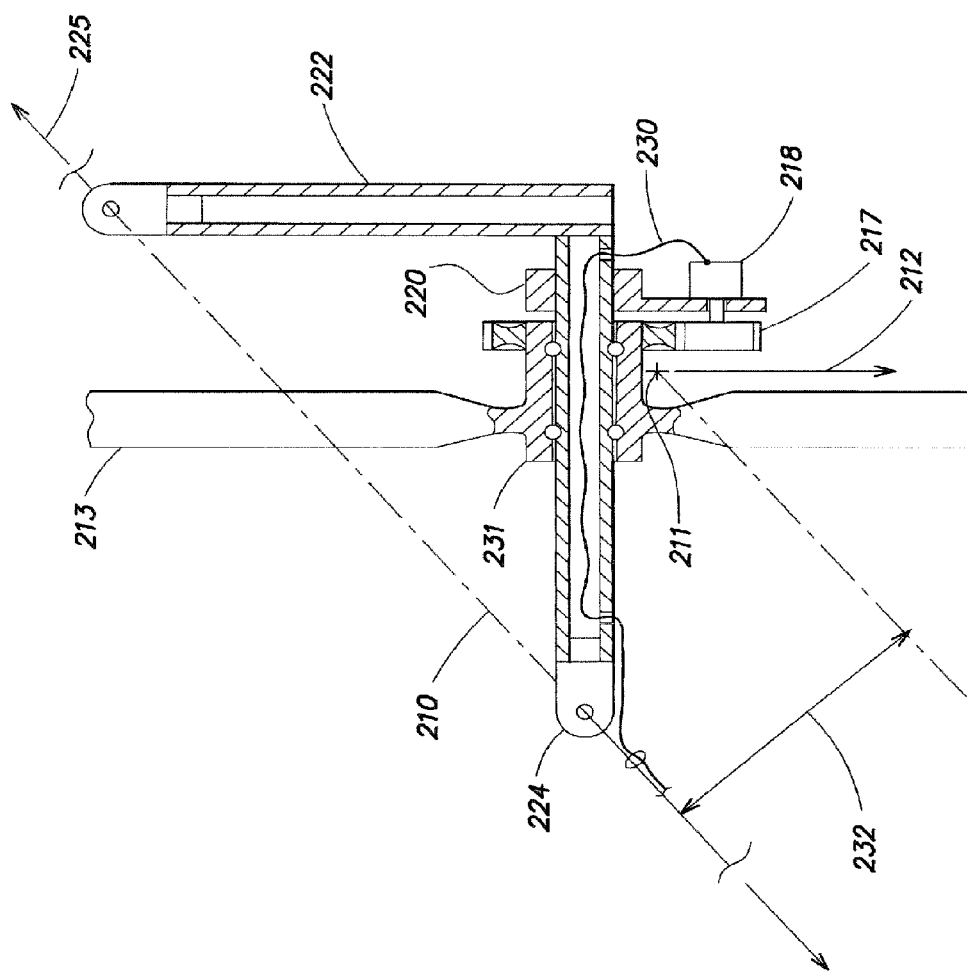
FIG. 7 is a detailed view partly cross section of the turbine section of the system showing in FIG. 6 when the system includes one turbine.

FIG. 6 is a side view partly cross section of the second embodiment of the system of the present invention; FIG. 7 and FIG. 8 are two detailed side view partly cross section versions of this second embodiment; FIG. 9 is a detailed cross section of the turbines blades showing in FIG. 8. In this second embodiment of the invention the wind turbine section include at least one wind turbine, but can include few wind turbines that part of them will rotate to the opposite direction from the rest. The turbine section of this embodiment is connected by tether to the lifting section, and by another tether to the anchoring section.

The lifting section: 214 is a lifting body that is filled with lighter than air gas 215, like helium, hydrogen, hot air or any other lighter than air gas. The lifting body has an aerodynamic shape so when the wind 240 is blowing over 214 additional lifting force acting on 214. The body 214 is connected to the turbine section of the system through tether 225.

In the turbine section, 221 is the main shaft, this is preferably a cylindrical hollow tube that gives a constructional strength to the turbine section; it made preferably from composite material or from other structural light material. The turbines 213 are rotatably mounted around 221 through a bearing assembly 231, in a way that they can rotate around the main shaft 221. A beam 222 is mounted and fixed rigidly and rectangular to the rear end of 221; the other end of 222 is connected to the tether 225 and through 225 to the lifting body 214; 220 is a rear supporting element that is mounted rigidly and fixed to the main shaft 221; 219 is a front supporting element that is mounted rigidly and fixed to the main shaft 221; on these two supporting elements, two electricity generators 218 are mounted; the generators 218 are connected to the turbines 213 through transmission wheels, 217 that are mounted rigidly to the generators shafts, and 216 that are mounted rigidly to the turbines 213; when the turbines 213 are rotating, the rotation is transmitted to the generators 218 through the said transmission wheels; (any other transmission type, like transmission belts can be used in order to transmit the rotation of the turbines 213 to the generator 218). 224 is a connecting element at the front end of 221; the tether 226 is connecting the turbine section to the anchoring base 228, through the winch 227, the winch 227 can control the operational altitude of the system; attached to the tether 226 is the wire 230; 230 is conducting the electricity that produced by the generators 218 and pass through the transformation unit 229; the role of the transformation unit 229 is to collect the electricity that has been generated by all generators 218 and to unify them to one electrical output at desired voltage.

The center of gravity of the turbine section is 211; the lift that is generating by the lifting section is 209; the line of tension, 210 is the line between the two points that connect the turbine section to the tethers 226 and 225, (the center of gravity and the line of tension has been defined above). The distance between 211 and the line 210 is 232, (232=d).

When the turbines 213 are not rotating the system will positioned it self in a way that the center of gravity 211, will be approximately vertically below the line of tension 210 (as pendulum). When turbines 213 exposed to wind 240, the system will be drifted down wind and the turbines 213 will start to rotate. In the version of the embodiment that is showing in FIG. 6 and FIG. 8 the two turbines will rotate in opposite direction because the blades of the two turbines has an opposite angle of attack relative to the wind direction 240, this is showing in FIG. 9, when the front turbine will rotate to 241 direction and the rear turbine will rotate to 242 direction. Each turbine will induce rotational torque on the shaft 221 through the generators 218; These torques will be WT1 and WT2; these two torques acting in opposite direction from each other and therefore they partially balance each other; the differential in the opposite torques will be WT3; as explained before the turbine section will start rolling angularly around the line 210; angle Alpha will be opened between the vertical plain that pass through line 210 and the plain that pass through point 211 (the center of gravity) and line 210; returning torque will act on the turbine section of the system in opposite direction of WT3; this returning torque will be RT, equal to: RT=mg×d×Sin. Alpha; (mg=212; d=232);

if WT3<mg×d×1, (Sin. 90=1) the system will reach equilibrium when 0<Alpha<90. If, WT3>mg×d, no equilibrium can be achieved and the system will keep rolling angularly, and electricity can not be produced.

It is important to understand that the turbines section can include any number of turbines and if, after balancing each other torque, the resultant torque will be WT3, the above calculation is valid.

FIG. 7 shows a version of this embodiment of the invention, where the turbine section includes one wind turbine; the torque that this turbine is inducing on the shaft 221 through the generator 218 is WT.

As explained above, if WT<mg×d×1, equilibrium can be achieved when: 0<Alpha<90; if WT>mg×d, no equilibrium can be achieved and the system will keep rolling angularly around line 210; in this case no electricity can be produced by the system.

To make the above description clearer here are some calculations for the version of the embodiment showing in FIG. 8.

In the following example the front turbine 113 has an output of 1.5 megawatt and the rear turbine 113 has an output of 1.25 megawatt, (the total output of the system=2.75 MW). The turbines are rotating at velocity of 10 rpm.

The total weight of the turbine section is 10 metric tons; the distance 232 is 5 meters (d=5 meters), therefore:

The angular velocity of the turbines is: 10×2×3.14/60=1.047 radian/second;

The torque that the front turbine is inducing on the shaft 221 is WT1;

As: torque×angular velocity=power;

WT1=1.5 megawatt/1.047=1.43 mega Newton×meter

The torque that induced on the shaft by the rear turbine 113 is WT2;

WT2=1.25 megawatt/1.047=1.19 mega Newton×meter;

As the two torques acting in opposite directions, the net torque acting on the shaft 221 is WT3;

WT3=WT1−WT2=(1.43−1.19) mega Newton×meter=0.24 mega Newton×meter;

When this torque is acting on the shaft 221, the turbine section of this version of the invention, will rotate in the torque direction, angle Alpha will be opened between the vertical plain that pass through line 210 and the plain that pass through point 211 and the line 210, resulting returning torque; this returning torque will be RT; RT=mg×d×Sin. Alpha;

as mg=10,000×9.8=98000 and d=5 meter;

At equilibrium position WT3=RT=0.24 mega Newton×meter=240,000 Newton×meter

Therefore sin Alpha at the equilibrium position of the turbines section will be:

Sin Alpha (at equilibrium)=RT/mg×d=WT3=240,000/490000=0.49;

Therefore the angle at which the system will reach equilibrium will be approximately 30 degree; (Sin. 30=0.5)

Figure 10:
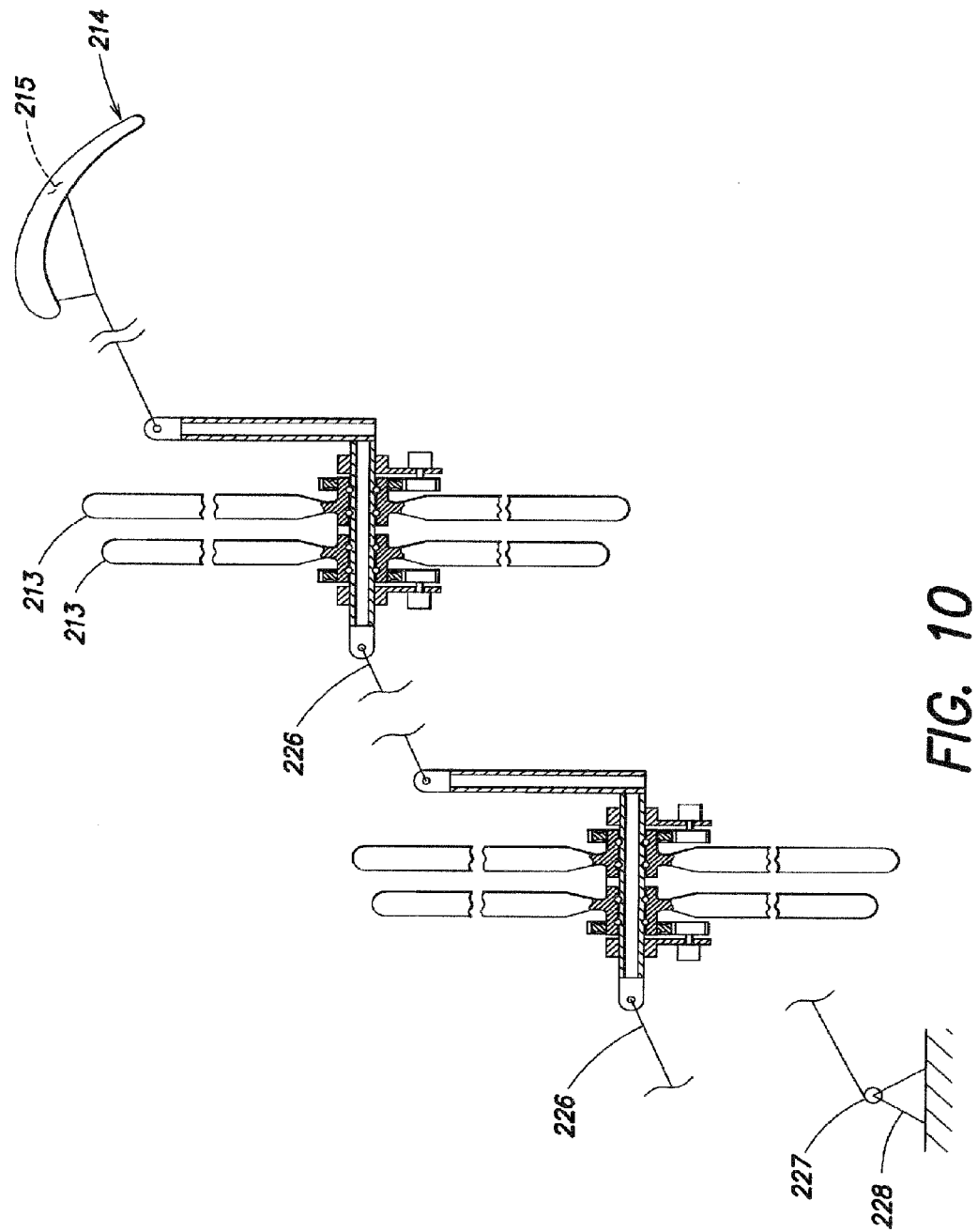
FIG. 10 is a side view partly cross section of another embodiment of an airborne wind turbine system in accordance with the present invention.

FIG. 10 is a side view partly cross section of the third embodiment of the present invention. In this embodiment there are plural of turbines sections that are connected by tether 226 in a serial formation; the upper turbines section is connected to the lifting section, and lower turbines section is connected to the anchoring base 228 preferably through winch 227 that can control the operational altitude of the said plural turbine sections;

Each turbine section, the lifting section, and the anchoring base are similar to those showed in FIG. 6, FIG. 8, and FIG. 7.

The advantages of this embodiment are: harvesting of wind energy in multiples altitudes by the same system; the cost of electricity output will be lower.

The disadvantage is: the system is more complicate to control and to maintain.

Figure 11:
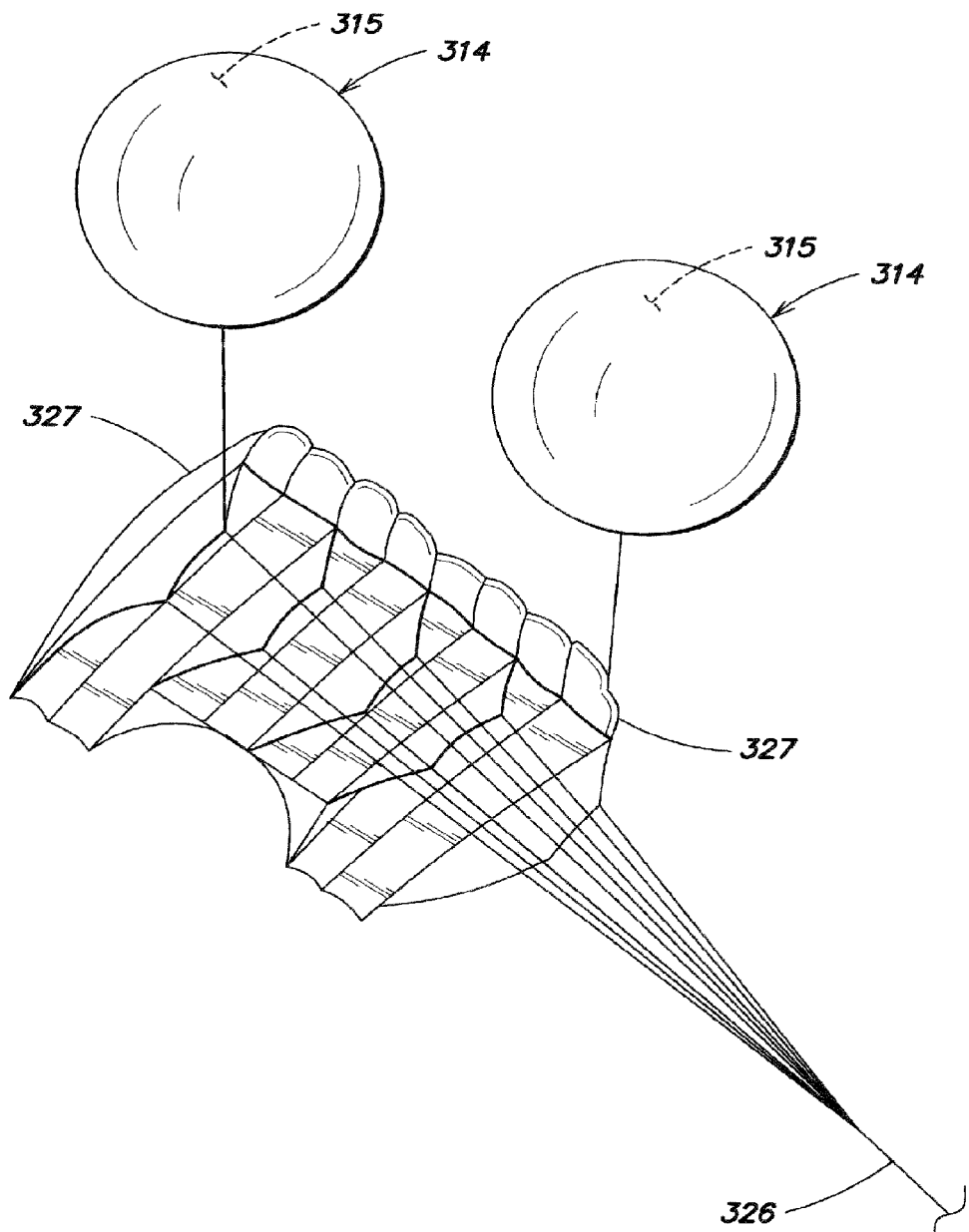
FIG. 11 is a detailed drawing of a version of a lifting section of a wind turbine system in accordance with the present invention.

FIG. 11 is showing possible lifting section that can generating the lifting force to the airborne system, in different embodiments of the invention.

327 is an air foil lifter kite; 314 are inflatable sealed balloons, 315 is lighter than air gas that is filled the balloons 314.

The combined lifting force of the balloons and the kite are generating the lifting force for the turbine sections of the systems of the present invention through the tether 326;

Using kite alone as the source of the lifting force of the system, or using lighter than air balloons alone as the source of the lifting force of the system is possible.

The advantage of combined lifting section like the one showing in FIG. 11 is that it will operate better in all level of wind velocities. When the wind velocity is low the balloon will generate the main lifting force, when the wind velocity is higher the balloons will drifted stronger down wind and the system can lose altitude, but the air foil kite will generate more lifting force at high wind velocity an will make the control of the system altitude, and the angle of the tether 326 more controllable. A unify body which include the aerodynamic properties of a kite, with the floating properties of lighter than air balloon is possible and showing as item 214 in FIG. 6.

Any of the systems described above can be constructed to operate over land or offshore, over a body of water. Moreover, the systems are easily can operate in various altitudes to maximize the exposure of the systems to high velocity winds. An offshore operation in which the system is mounted to a floating rig on a body of water is likely to be cheaper and easier to implement than existing offshore wind-based electricity generating systems which are mounted on towers because the system in accordance with the invention requires only an anchoring point on the ocean floor, or on a floating rig, with no other constructions.

It is to be understood that the present invention is not limited to the embodiments described above, but include any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. An airborne system for producing electricity from wind energy, comprising:
   a turbine section comprising:
     a shaft;
     at least one turbine rotatably mounted to said shaft and arranged to rotate when exposed to a wind; and
     at least one generator coupled to the at least one turbine, and arranged to convert the rotation of the at least one turbine into electricity;
   a lifting section connected to a portion of the turbine section for generating a lifting force to cause the turbine section to be airborne at desire altitude;
   an anchoring section connected by a tether to another portion of the turbine section to anchor the turbine section to a base relative to the earth; and
   a conductor connected to the turbine section to conduct electricity that is generated by the at least one generator for usage or for energy storage;
   wherein said turbine section is constructed such that the center of gravity of the turbine section is approximately in the lowest possible position relative to a substantially straight line between a portion of the turbine section that is connected to the lifting section and the another portion of the turbine section that is connected to the anchoring section, while the at least one turbine is in rest;
   wherein the at least one turbine exposed to wind is rotated and causes rotational torque to be induced on the turbine section, that causes an angular deviation of the center of gravity from lowest possible position;
   wherein said angular deviation of the center of gravity causes a returning torque that increases with the increasing of the angular deviation; and
   wherein the returning torque acts on the turbine section, causing the turbine section to reach a stabilized angular position.

2. The system of claim 1, wherein the turbine section comprises:
   at least two wind turbines that are rotated in opposite directions when exposed to the same wind; and
   wherein the turbines that are exposed to a wind and rotate in opposite directions induce opposite rotational torques on the turbine section;
   wherein a differential torque from the opposite rotational torques of the at least two turbines is induced on the turbine section, causing an angular deviation of the turbine section from the rest angular position;
   wherein said angular deviation causes a returning torque which increases with an increasing of the angular deviation; and
   wherein the returning torque balances the induced differential torque and causes said turbine section to be angularly stable, while the generators of the system are rotating and generating electricity for usage or for energy storage.

3. The system of claim 1, wherein the lifting section comprises at least one sealed inflatable body that is filled with lighter than air gas.

4. The system of claim 3, wherein said lighter than gas air is helium.

5. The system of claim 3, wherein said lighter than air gas is hydrogen.

6. The system of claim 1, wherein said tether is made from a composite material.

7. The system of claim 1, wherein the lifting section comprises at least one aerodynamic kite that generates a lifting force that causes the system to be airborne at a desired altitude.

8. The system of claim 1, wherein the lifting section comprises at least one inflatable body filled with lighter than air gas and at least one kite.

9. The system of claim 1, further comprising a plurality of turbine sections that are connected to one another by a tether in a serial formation, and are arranged to harvest the wind energy in multi altitudes.

* * * * *